(12) United States Patent
Yang et al.

(10) Patent No.: US 11,683,611 B1
(45) Date of Patent: Jun. 20, 2023

(54) RESETTLE TIMING FOR LOW POWER PIXEL READOUT

(71) Applicant: OMNIVISION TECHNOLOGIES, INC., Santa Clara, CA (US)

(72) Inventors: Zheng Yang, San Jose, CA (US); Ling Fu, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/714,738

(22) Filed: Apr. 6, 2022

(51) Int. Cl.
*H04N 25/75* (2023.01)
*H04N 25/709* (2023.01)
*H04N 25/772* (2023.01)
*H04N 25/78* (2023.01)

(52) U.S. Cl.
CPC .......... *H04N 25/75* (2023.01); *H04N 25/709* (2023.01); *H04N 25/772* (2023.01)

(58) Field of Classification Search
CPC .... H04N 25/75; H04N 25/709; H04N 25/772; H04N 25/78
See application file for complete search history.

(56) References Cited

U.S. PATENT DOCUMENTS

| | | | |
|---|---|---|---|
| 9,538,111 B2 | 1/2017 | Yang et al. | |
| 10,116,892 B1* | 10/2018 | Wang | H04N 25/67 |
| 11,140,343 B1* | 10/2021 | Ramakrishnan | H04N 25/77 |
| 2014/0333815 A1 | 11/2014 | Iwane et al. | |
| 2020/0396402 A1 | 12/2020 | Freson | |
| 2021/0258563 A1* | 8/2021 | Zhan | H04N 25/75 |

* cited by examiner

*Primary Examiner* — Marly S Camargo
(74) *Attorney, Agent, or Firm* — Perkins Coie LLP

(57) ABSTRACT

A pixel readout circuit includes an analog to digital converter coupled to the bitline output of the pixel circuit. A switch is coupled between the bitline output of the pixel circuit and a reference voltage. The switch is pulsed on and off a first time to settle the bitline to the reference voltage prior to an autozero operation of the analog to digital converter. The switch is pulsed on and off a second time to settle the bitline to the reference voltage after the autozero operation and prior to a first analog to digital conversion. The switch is configured to be pulsed on and off a third time to settle the bitline to the reference voltage after the first analog to digital conversion operation and prior to a second analog to digital conversion operation.

18 Claims, 3 Drawing Sheets

RESETTLE TIMING FOR LOW POWER PIXEL READOUT

BACKGROUND INFORMATION

Field of the Disclosure

This disclosure relates generally to image sensors, and in particular but not exclusively, relates to the readout of image sensors through column bitlines.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
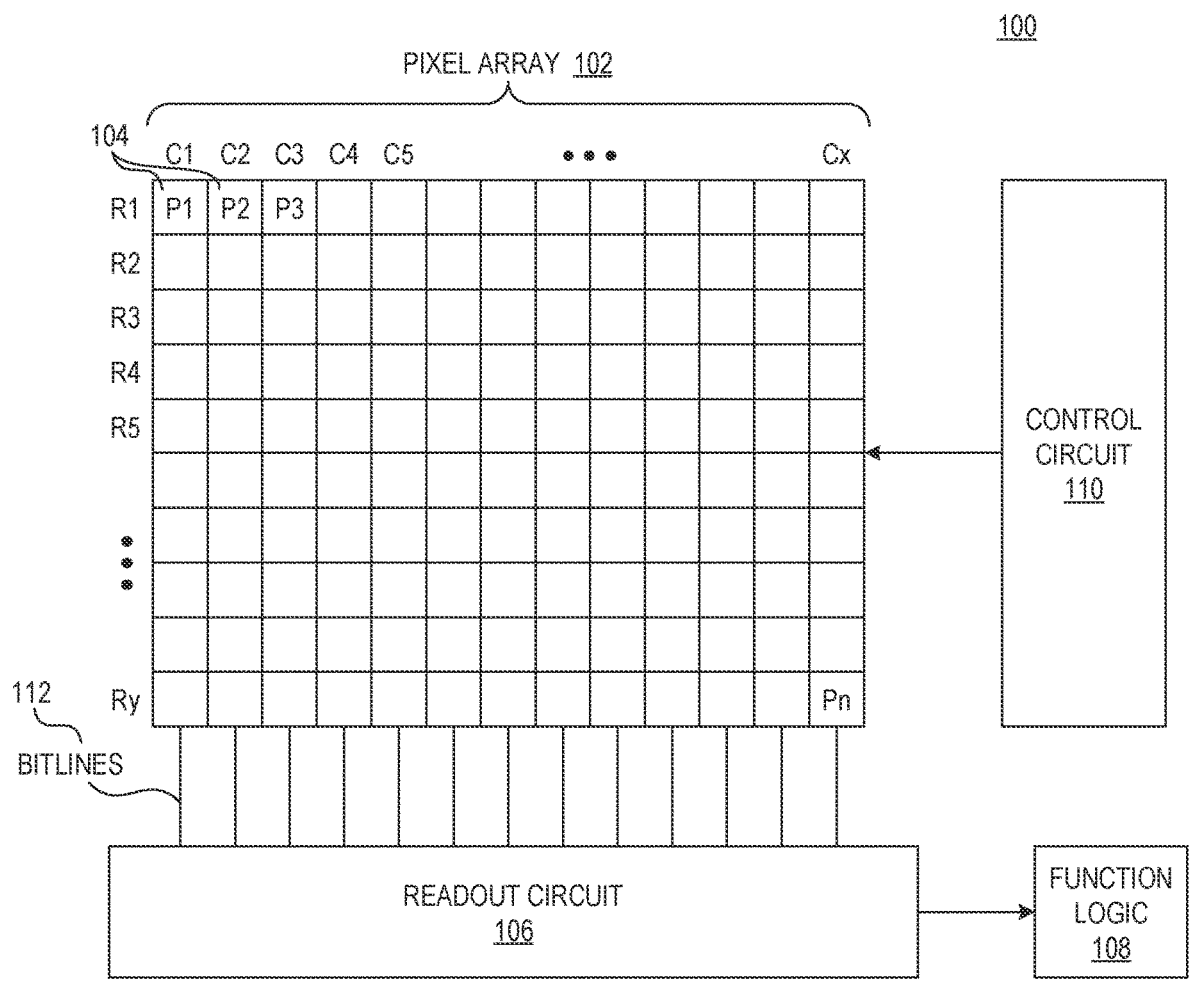
FIG. 1 illustrates one example of an imaging system including a pixel array coupled to a readout circuit through bitlines in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system including a pixel array of pixel circuits coupled to a readout circuit through bitlines are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, an imaging system including a pixel array of pixel circuits coupled to a readout circuit through bitlines are described. In various examples, the readout circuit includes a plurality of pixel readout circuits, which are coupled to pixel circuits in the pixel array through bitlines. In the various examples, a pixel readout circuit includes an analog to digital converter coupled to a bitline output of a pixel circuit through a bitline. A bias current source is coupled between the bitline output of the pixel circuit and ground. A switch is coupled between the bitline output of the pixel circuit and a reference voltage. In operation, the switch is configured to be pulsed on and off a first time to settle the bitline to the reference voltage prior to an autozero operation of the analog to digital converter for each readout of the pixel circuit. The switch is configured to be pulsed on and off a second time to settle the bitline to the reference voltage after the autozero operation and prior to a first of the analog to digital conversion operation of the analog to digital converter for each readout of the pixel circuit. The switch is configured to be pulsed on and off a third time to settle the bitline to the reference voltage after the first analog to digital conversion operation and prior to a second analog to digital conversion operation of the analog to digital converter for each readout of the pixel circuit.

It is appreciated that example readout circuits in accordance with the teachings of the present invention reduce the DC bias current during readouts and that fixed pattern noise and/or vertical shading issues can be canceled with the use of correlated double sampling when generating pixel circuit readouts.

To illustrate, FIG. 1 illustrates one example of an imaging system 100 including an imaging device with an array of pixel circuits in accordance with the teachings of the present invention. In particular, imaging system 100 includes a pixel array 102, a control circuit 110, a readout circuit 106, and function logic 108. In one example, pixel array 102 is a two-dimensional (2D) array of pixel circuits 104, (e.g., P1, P2, . . . , Pn). As illustrated in the depicted example, pixel circuits 104 are arranged into rows (e.g., R1 to Ry) and columns (e.g., C1 to Cx) to acquire image data of a person, place, object, etc., which can then be used acquire and render a 2D image of the person, place, object, etc.

In one example, one or photodiodes in each pixel circuit 104 in pixel array 102 is configured to photogenerate image charge in response to incident light. The image charge generated in each photodiode in pixel circuits 104 is transferred to a floating diffusion in each pixel circuit 104, which is converted to an image signal and is then read out from each pixel circuit 104 by a pixel readout circuit included readout circuit 106 through a respective bitline 112. In various examples, the signals read out from pixel array 102 may be amplified, digitized, and then transferred to function logic 108. In various examples, the readout circuit 106 includes amplification circuitry, analog to digital converters (ADC), or otherwise. In one example, the readout circuit 106 may read out a row of data at a time along column bitlines 112 as illustrated in FIG. 1 or may read out the data using a variety of other techniques (not illustrated), such as a serial readout or a full parallel readout of all pixel circuits simultaneously. The function logic 108 may store the image data or even manipulate the image data by applying post image effects (e.g., crop, rotate, remove red eye, adjust brightness, adjust contrast, or otherwise).

Figure 2:
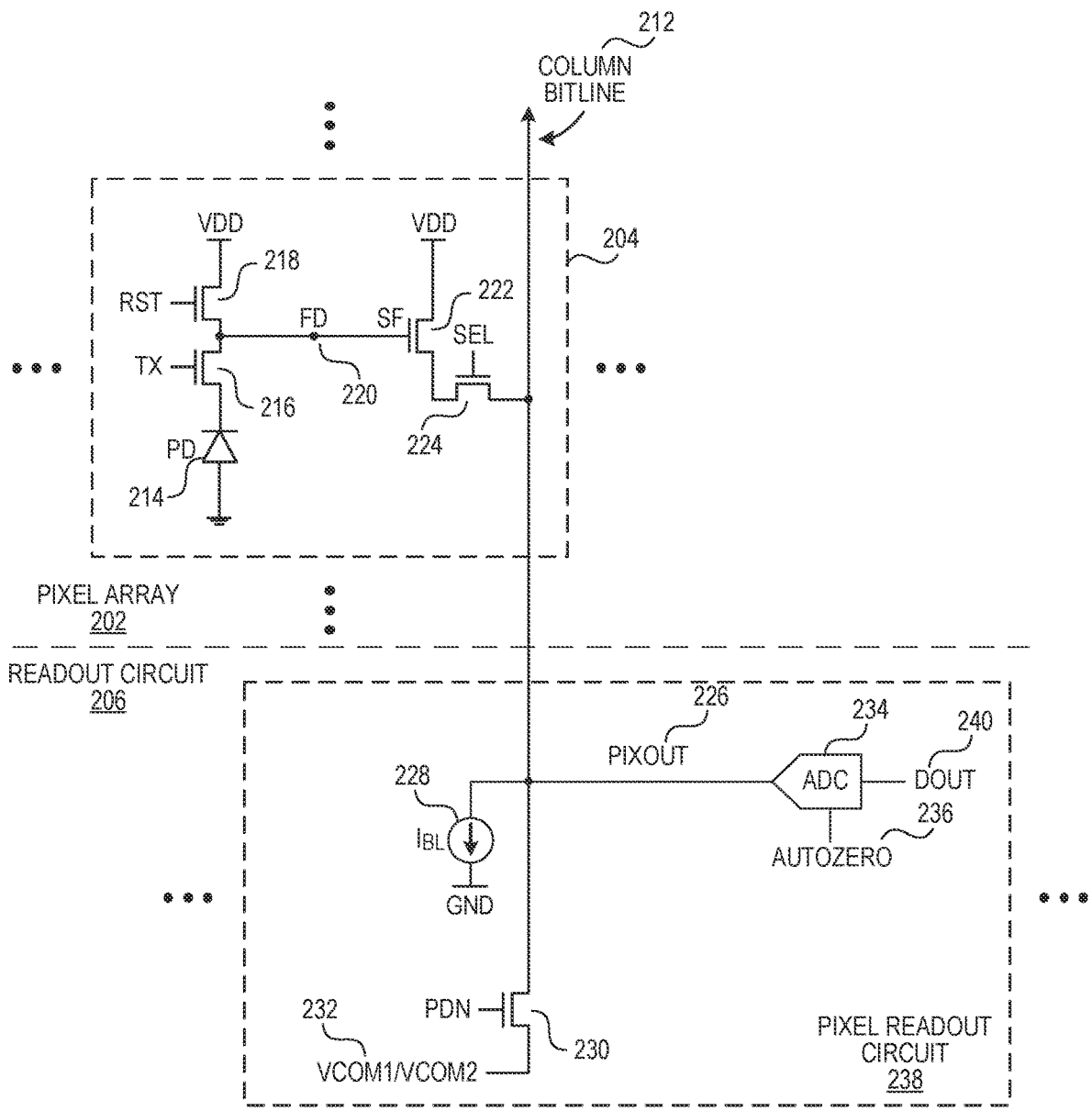
FIG. 2 illustrates one example of a pixel circuit included in a pixel array coupled to an example readout circuit through a bitline in accordance with the teachings of the present disclosure.

FIG. 2 illustrates one example of a pixel circuit 204 included in a pixel array 202 coupled to an example pixel readout circuit 238 included in a readout circuit 206 through a bitline 212 in accordance with the teachings of the present disclosure. It is appreciated the pixel array 202, pixel circuit 204, bitline 212, and readout circuit 206 of FIG. 2 may be examples of the pixel array 102, pixel circuit 104, bitline 112, and readout circuit 106 of FIG. 1, and that similarly named and numbered elements described above are coupled and function similarly below.

In the example depicted in FIG. 2, pixel circuit 204 includes a photodiode 214 coupled to a transfer transistor 216, which is coupled to a floating diffusion 220. In operation, transfer transistor 216 is coupled to be controlled in response to a transfer control signal TX. As such, charge photogenerated in photodiode 214 in response to incident light is transferred to floating diffusion 220 in response to transfer control signal TX.

Continuing with the example depicted in FIG. 2, a reset transistor 218 is coupled between a voltage supply (e.g., VDD) and the floating diffusion 220. In operation, the reset transistor 218 is configured to reset pixel circuit 204 including the charge in floating diffusion 220 in response to a reset control signal RST.

As shown in the depicted example, a gate of a source follower transistor 222 is coupled to the floating diffusion 220. In the example, the drain of the source follower transistor 222 is coupled to the voltage supply (e.g., VDD), and the source of source follower transistor 222 is coupled to a column bitline 212 through a row select transistor 223. Thus, in other words, the source follower transistor 222 and the row select transistor 224 are coupled between the voltage supply (e.g., VDD) and the column bitline 212. In operation, the row select transistor 224 is configured to output an analog signal (e.g., PIXOUT 226) that is representative of the charge in floating diffusion 220 from the source follower transistor 222 of pixel circuit 204 to column bitline 212 in response to a row select signal SEL. It is appreciated therefore that the output terminal of row select transistor 224 that is coupled to bitline 212 is the bitline output of pixel circuit 204.

The example depicted in FIG. 2 shows that readout circuit 206 includes a pixel readout circuit 238, which is coupled to bitline 212. In various example, readout circuit 206 may include a plurality of pixel readout circuits 238, each of which may be coupled to a respective bitline 212 in accordance with the teachings of the present invention. As shown in the depicted example, an analog to digital converter (ADC) 234 is coupled to the column bitline 212 to perform ADC conversions of the analog signals PIXOUT 226 received from pixel circuit 204 through column bitline 212. In the depicted example, an autozero operation of ADC 234 may be performed in response to an autozero signal 236. The digital output of ADC 234 is shown as a digital output signal DOUT 240. In one example, pixel readout circuit 238 may also include a bias current source 228 coupled to bitline 212 between the bitline output of the pixel circuit 204 and ground. In one example, the bias current source 228 is configured to draw a small bias current of $I_B$.

In the various examples, each readout of the pixel circuit 204 by pixel readout circuit 238 includes an autozero operation, a first analog to digital conversion operation, and then a second analog to digital conversion operation. In the examples, a correlated double sampling output of the pixel circuit 204 is configured to be generated in response to a difference between the first and second analog to digital conversion operations of analog to digital converter 234. For example, the first analog to digital conversion operation of analog to digital converter 234 is configured to convert a reset value of PIXOUT 226 from the pixel circuit 204 through the bitline 212 and the second analog to digital conversion operation of analog to digital converter 234 is configured to convert a signal value of PIXOUT 226 from the pixel circuit 204 through the bitline 212. It is appreciated by finding the difference between the signal value of PIXOUT 226 and the reset value of PIXOUT 226 from pixel circuit through bitline 212, fixed pattern noise and vertical shading issues may be canceled in accordance with the teachings of the present invention.

As shown in the depicted example, pixel readout circuit 238 also includes a switch 230 coupled to bitline 212 between the bitline output of the pixel circuit 204 and a reference voltage 232. In operation, the switch 230 is configured to be pulsed on and off in response to a control signal PDN a first time to settle the bitline 212 to the reference voltage 232 prior to an autozero operation of the analog to digital converter 234 in response to autozero signal 236 for each readout of the pixel circuit 204. The switch 230 is configured to be pulsed on and off in response to the control signal PDN a second time to settle the bitline 212 to the reference voltage 232 after the autozero operation of analog to digital converter 234 and prior to a first of the analog to digital conversion operation of the analog to digital converter 234 for each readout of the pixel circuit 204. The switch 230 is then configured to be pulsed on and off a third time in response to the control signal PDN to settle the bitline 212 to the reference voltage 232 after the first analog to digital conversion operation of the analog to digital converter 234 and prior to a second analog to digital conversion operation of the analog to digital converter 234 for each readout of the pixel circuit 204.

In various examples, the reference voltage 232 may be equal to a first reference voltage VCOM1 or a second reference voltage VCOM2. For instance, in one example, the reference voltage 232 is configured to be equal to the first reference voltage VCOM1 when the switch 230 is configured to be pulsed on and off the first time to settle bitline 212 prior to the autozero operation of the analog to digital converter 234. In the example, the reference voltage 232 is configured to be equal to the second reference voltage VCOM2 when the switch 230 is configured to be pulsed on and off the second time and the third time to settle the bitline 212 prior to the first and second analog to digital conversion operations by the analog to digital converter 234. In the various examples, the first reference voltage VCOM1 is greater than the second reference voltage VCOM2. For instance, in one example, the first reference voltage VCOM1 is approximately 1.0 volts and the second reference voltage VCOM2 is approximately 0.0 volts. It is appreciated with the bitline 212 being settled to the same second reference voltage VCOM2 during the second and third times that the switch 230 is pulsed on and off, the loading of the bitline 212 in response to the switch 230 being pulsed on and off the second time prior to the first analog to digital conversion operation of analog to digital converter 234 is substantially equal to the loading of the bitline 212 in response to the switch 230 being pulsed on and off the third time prior to the second analog to digital conversion operation of analog to digital converter 234.

Figure 3:
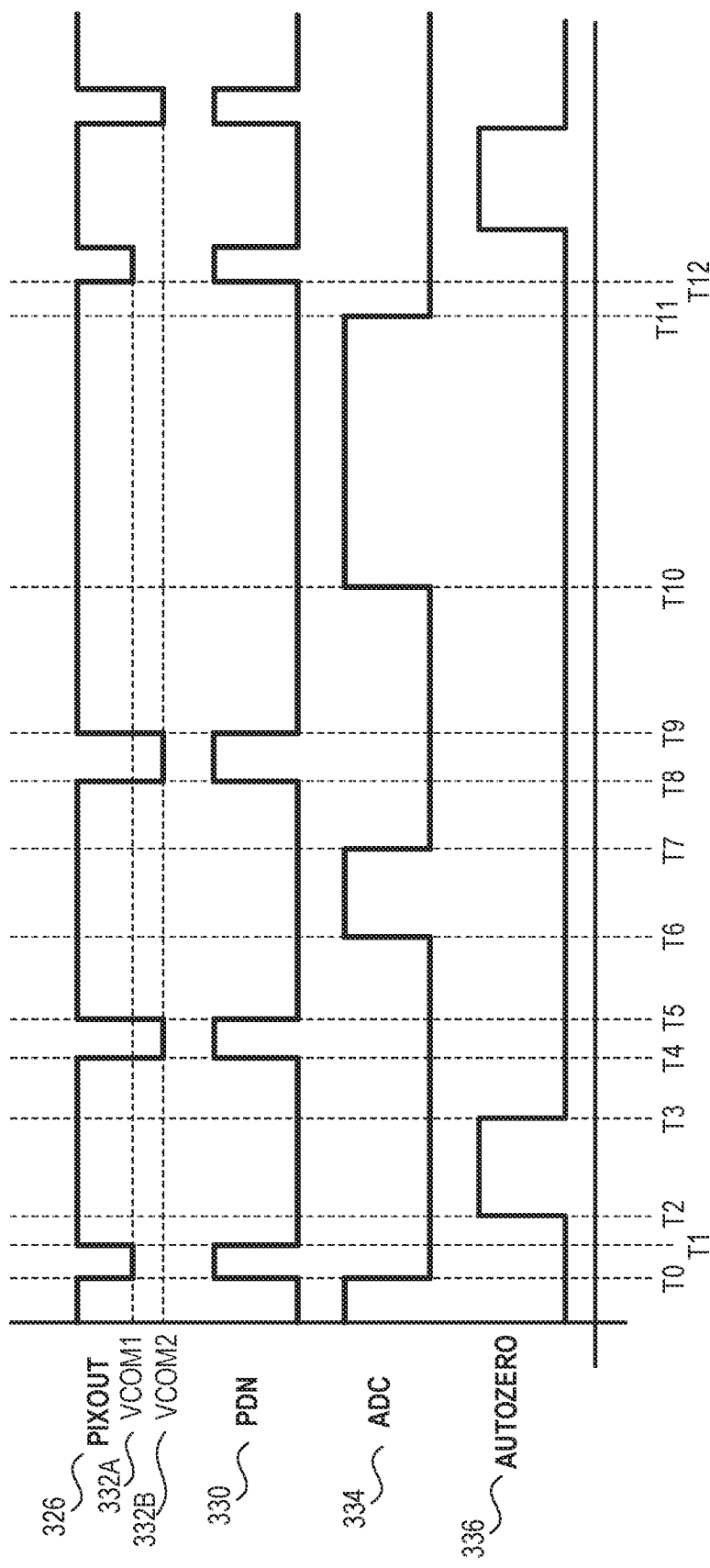
FIG. 3 illustrates one example of a timing diagram of an example readout circuit configured to readout a pixel circuit through a bitline in accordance with the teachings of the present disclosure.

FIG. 3 illustrates one example of a timing diagram of signals in an example pixel readout circuit configured to readout a pixel circuit through a bitline in accordance with the teachings of the present disclosure. It is appreciated the example pixel readout circuit that is being readout in FIG. 3 may be an example of pixel readout circuit 238 of FIG. 2, and that similarly named and numbered elements described above are coupled and function similarly below.

As shown in the depicted example, the PDN signal 330 is pulsed on and off a first time between time T0 and time T1 prior to an autozero operation performed in the analog to digital converter in response to the autozero signal 336 being turned on and then off between time T2 and time T3. As such, the PIXOUT signal 326 is pulled down between time T0 and time T1 to the reference voltage, which in the depicted example is equal to the first reference voltage VCOM1 332A between time T0 and time T1. In the depicted example, the first reference voltage VCOM1 332A is equal to approximately 1.0 volts. It is appreciated that when the bitline 212 is therefore discharged between time T0 and time T1 to the first reference voltage VCOM1 332A. In the various examples, the source follower transistor 222 pulls up the bitline 212 as governed by the voltage at the floating diffusion 220 without any DC bias current, or in one example with a very small bias current $I_{BL}$.

Continuing with the depicted example, after the bitline 212 is settled between time T0 and time T1 to the reset level as determined by reference voltage VCOM1 332A, and the autozero operation of the operation of the analog to digital converter 234 between time T2 and time T3 is performed, the PDN signal 330 is then pulsed on and off a second time between time T4 and time T5. As such, the PIXOUT signal 326 is pulled down between time T4 and time T5 to the reference voltage, which in the depicted example is equal to the second reference voltage VCOM2 332B between time T4 and time T5. In the depicted example, the second reference voltage VCOM2 332B is equal to approximately 0.0 volts. It is appreciated that the bitline 212 is therefore discharged between time T4 and time T5 to the second reference voltage VCOM2 332B.

After the bitline 212 is resettled between time T4 and time T4 to the reset level as determined by reference voltage VCOM2 332B, a first analog to digital conversion is performed between time T6 and time T7, as indicated with ADC signal 334. Thus, in the example, the first analog to digital conversion that is performed between time T6 and time T7 is of the reset level value of the PIXOUT signal 326.

Continuing with the depicted example, after the first analog to digital conversion is performed between time T6 and time T7, the PDN signal 330 is then pulsed on and off a third time between time T8 and time T9. As such, the PIXOUT signal 326 is pulled down again between time T8 and time T9 to the reference voltage, which in the depicted example is again equal to the second reference voltage VCOM2 332B between time T8 and time T9. In the depicted example, the second reference voltage VCOM2 332B is equal to approximately 0.0 volts. It is appreciated that the bitline 212 is therefore discharged between time T8 and time T9 to the second reference voltage VCOM2 332B.

In the various examples, it is appreciated that with the bitline 212 being settled to the same second reference voltage VCOM2 332B during the second and third times that the switch 230 is pulsed on and off between times T4 and T5 and between times T8 and T9, the loading of the bitline 212 between times T4 and T5 is substantially equal to the loading of the bitline 212 between times T8 and T9. As such, the status of bitline 212 between times T4 and T5 is substantially equal to the status of the bitline 212 between times T8 and T9, and the status of bitline 212 after time T5 (e.g., between times T5 and T6) and after time T9 (e.g., between times T9 and T10) will therefore also be same.

After the bitline 212 is resettled between time T8 and time T9 to the reset level as determined by reference voltage VCOM2 332B, a second analog to digital conversion is performed between time T10 and time T11, as indicated with ADC signal 334. In one example, the second analog to digital conversion that is performed between time T10 and time T11 is performed on a signal level of the PIXOUT signal 326.

In the depicted example, the next readout of the pixel circuit may begin at time T12, where the readout processing repeats as described above between time T0 and time T11. As such, the PDN signal 330 is pulsed on and off for a first time again starting at time T12 prior to another autozero operation that performed in the analog to digital converter for the next readout of the pixel circuit.

In various examples, it is appreciated that a correlated double sampling value of the PIXOUT signal 326 can be generated in response to a difference between the second and first analog to digital conversions of the PIXOUT signal 326. It is further appreciated that since the settling loading of the bitline 212 after time T5 (e.g., between times T5 and T6) is substantially equal to the settling loading of the bitline 212 after time T9 (e.g., between times T9 and T10), no autozero involved, fixed pattern noise and vertical shading issues are canceled by the correlated double sampling.

It is also appreciated that in the example in which the first settling of the bitline 212 between time T0 and time T1 is to a higher voltage VCOM1 332A of 1.0 volts (compared to the lower voltage VCOM2 3323B of 0.0 volts), the voltage swing of the PIXOUT signal 326 on the bitline 212 can also start from the higher voltage set by VCOM1 332A to reduce the bitline voltage swing by approximately 1.0 volt, which saves energy at the expense of a larger autozero error. However, these larger autozero errors can be cancelled by correlated double sampling in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A pixel readout circuit, comprising:
   an analog to digital converter coupled to the bitline output of the pixel circuit; and
   a switch coupled between the bitline output of the pixel circuit and a reference voltage,
   wherein the switch is configured to be pulsed on and off a first time to settle the bitline to the reference voltage prior to an autozero operation of the analog to digital converter for each readout of the pixel circuit,
   wherein the switch is configured to be pulsed on and off a second time to settle the bitline to the reference voltage after the autozero operation and prior to a first analog to digital conversion operation of the analog to digital converter for each readout of the pixel circuit,
   wherein the switch is configured to be pulsed on and off a third time to settle the bitline to the reference voltage after the first analog to digital conversion operation and prior to a second analog to digital conversion operation of the analog to digital converter for each readout of the pixel circuit.

2. The pixel readout circuit of claim 1, further comprising a bias current source coupled between the bitline output of the pixel circuit and ground.

3. The pixel readout circuit of claim 1, wherein each readout of the pixel circuit includes the autozero operation, the first analog to digital conversion operation, and then the second analog to digital conversion operation.

4. The pixel readout circuit of claim 3, wherein a correlated double sampling output of the pixel circuit is configured to be generated in response to a difference between the first and second analog to digital conversion operations.

5. The pixel readout circuit of claim 4, wherein the first analog to digital conversion operation is configured to convert a reset value from the pixel circuit through the bitline, wherein the second analog to digital conversion operation is configured to convert a signal value from the pixel circuit through the bitline.

6. The pixel readout circuit of claim 1, wherein the reference voltage is configured to be equal to a first reference voltage value when the switch is configured to be pulsed on and off the first time, wherein the reference voltage is configured to be equal to a second reference voltage value when the switch is configured to be pulsed on and off the second time and the third time.

7. The pixel readout circuit of claim 6, wherein the first reference voltage is greater than the second reference voltage.

8. The pixel readout circuit of claim 7, wherein the first reference voltage is approximately one volt and the second reference voltage is approximately zero volts.

9. The pixel readout circuit of claim 1, wherein a first loading of the bitline in response to the switch being pulsed on and off the second time is substantially equal to a second loading of the bitline in response to the switch being pulsed on and off the third time.

10. An imaging system, comprising:
    a pixel array including a plurality of pixel circuits;
    a readout circuit coupled to the pixel array through a plurality of bitlines, wherein the readout circuit includes a plurality of pixel readout circuits coupled to the plurality of bitlines, wherein each one of the plurality of pixel readout circuits comprises:
    an analog to digital converter coupled to one of the plurality of bitlines to readout image data from pixel circuit outputs of the plurality of pixel circuits that are coupled to said one of the plurality of bitlines; and
    a switch coupled to said one of the plurality of bitlines between the pixel circuit outputs and a reference voltage,
    wherein the switch is configured to be pulsed on and off a first time to settle said one of the plurality of bitlines to the reference voltage prior to an autozero operation of the analog to digital converter for each readout of one of the plurality of pixel circuits,
    wherein the switch is configured to be pulsed on and off a second time to settle said one of the plurality of bitlines to the reference voltage after the autozero operation and prior to a first analog to digital conversion operation of the analog to digital converter for each readout of said one of the plurality of pixel circuits,
    wherein the switch is configured to be pulsed on and off a third time to settle said one of the plurality of bitlines to the reference voltage after the first analog to digital conversion operation and prior to a second analog to digital conversion operation of the analog to digital converter for each readout of said one of the plurality of pixel circuits.

11. The imaging system of claim 10, wherein each one of the plurality of pixel readout circuits further comprises a bias current source coupled between the bitline output of the pixel circuit and ground.

12. The imaging system of claim 10, wherein each readout of said one of the plurality of pixel circuits includes the autozero operation, the first analog to digital conversion operation, and then the second analog to digital conversion operation.

13. The imaging system of claim 12, wherein a correlated double sampling output of said one of the plurality of pixel circuits is configured to be generated in response to a difference between the first and second analog to digital conversion operations.

14. The imaging system of claim 13, wherein the first analog to digital conversion operation is configured to convert a reset value from said one of the plurality of pixel circuits through said one of the plurality of bitlines, wherein the second analog to digital conversion operation is configured to convert a signal value from said one of the plurality of pixel circuits through said one of the plurality of bitlines.

15. The imaging system of claim 10, wherein the reference voltage is configured to be equal to a first reference voltage value when the switch is configured to be pulsed on and off the first time, wherein the reference voltage is configured to be equal to a second reference voltage value when the switch is configured to be pulsed on and off the second time and the third time.

16. The imaging system of claim 15, wherein the first reference voltage is greater than the second reference voltage.

17. The imaging system of claim 16, wherein the first reference voltage is approximately one volt and the second reference voltage is approximately zero volts.

18. The imaging system of claim 10, wherein a first loading of said one of the plurality of bitlines in response to the switch being pulsed on and off the second time is substantially equal to a second loading of said one of the plurality of bitlines in response to the switch is being pulsed on and off the third time.

* * * * *